US005302874A

United States Patent [19]

Pinkerton

[11] Patent Number: 5,302,874
[45] Date of Patent: Apr. 12, 1994

[54] MAGNETIC BEARING AND METHOD UTILIZING MOVABLE CLOSED CONDUCTIVE LOOPS

[75] Inventor: Joseph F. Pinkerton, Austin, Tex.

[73] Assignee: Magnetic Bearing Technologies, Inc., Austin, Tex.

[21] Appl. No.: 996,192

[22] Filed: Dec. 23, 1992

Related U.S. Application Data

[63] Continuation-in-part of Ser. No. 950,607, Sep. 25, 1992, abandoned.

[51] Int. Cl.⁵ ............................................. H02K 7/02
[52] U.S. Cl. ................................................... 310/90.5
[58] Field of Search ...................... 310/90.5, 255, 259, 310/262, 48, 68.3

[56] References Cited

U.S. PATENT DOCUMENTS

| | | |
|---|---|---|
| 2,305,416 | 11/1941 | Hansen, Jr. . |
| 2,987,924 | 6/1961 | Karrels . |
| 3,107,310 | 10/1963 | Carriere et al. . |
| 3,146,038 | 8/1964 | Lautzenhiser . |
| 3,184,271 | 5/1965 | Gilinson, Jr. . |
| 3,228,253 | 1/1966 | Jaroszewski . |
| 3,304,527 | 2/1967 | Marrs et al. . |
| 3,470,828 | 10/1969 | Powell, Jr. et al. . |
| 3,535,597 | 10/1970 | Kendrick . |
| 3,618,137 | 11/1971 | Bassett et al. . |
| 3,741,613 | 6/1973 | Pfaler . |
| 3,768,417 | 10/1973 | Thornton et al. . |
| 3,811,740 | 5/1974 | Sacerdoti et al. . |
| 3,929,390 | 12/1975 | Simpson . |
| 4,000,929 | 1/1977 | Studer . |
| 4,037,886 | 7/1977 | Boden et al. . |
| 4,285,553 | 8/1981 | Robinson . |
| 4,316,394 | 2/1982 | Donogne . |
| 4,363,525 | 12/1982 | Poubeau . |
| 4,470,644 | 9/1984 | Weisser . |
| 4,541,772 | 9/1985 | Becker . |
| 4,583,794 | 4/1986 | Takahara et al. . |
| 4,700,094 | 10/1987 | Downer et al. . |
| 4,779,538 | 10/1988 | Fujiwara et al. . |
| 4,785,212 | 11/1988 | Downer et al. . |
| 4,870,310 | 9/1989 | Triplett . |
| 4,913,059 | 4/1990 | Fujie et al. . |
| 5,124,605 | 6/1992 | Bitterly et al. . |
| 5,177,387 | 1/1993 | McMichael et al. ................ 310/90.5 |

OTHER PUBLICATIONS

"Compulsator Research at the University of Texas-An Overview", M. L. Spann et al., Publication No. PR74, presented at the 4th Symposium on Electromagnetic Launch Technology, Austin, TX Apr. 12-14, 1988.

Primary Examiner—Steven L. Stephan
Assistant Examiner—E To
Attorney, Agent, or Firm—Beveridge, DeGrandi, Weilacher & Young

[57] ABSTRACT

A magnetic bearing system uses conductive loops which interact with magnets to levitate a rotor and to center it on a rotational axis. The rotor is provided with a plurality of closed loops of electrically conductive material with a finite inductance. Rotation causes the loops to travel along a prescribed circular path which carries them through a series of magnetic fields. In preferred embodiments, each loop is subjected to two magnetic fields simultaneously, and the magnets are positioned where a loop moving on its prescribed path will be equally subjected to the fields of the magnets. This produces equal and opposite electromotive forces in the loop so that no current will flow. However, when a loop deviates laterally from its prescribed path, the interior of the loop will be unequally subjected to the magnetic fields. This produces unequal and opposed electromotive forces in the loop, thus producing a current which in the presence of the magnetic fields exerts a force tending to move the loop laterally toward the prescribed path.

67 Claims, 8 Drawing Sheets

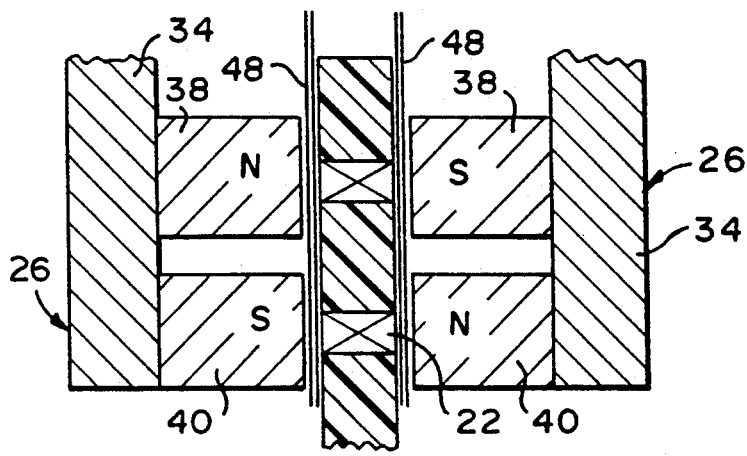
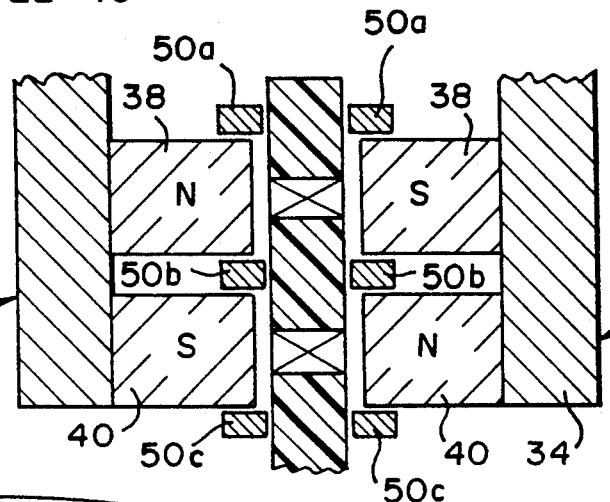
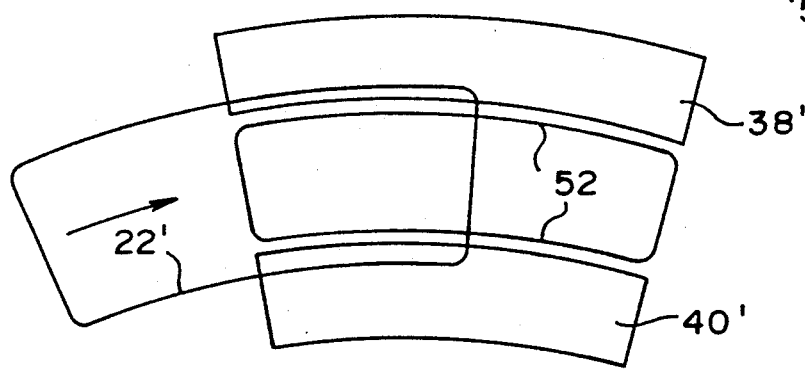
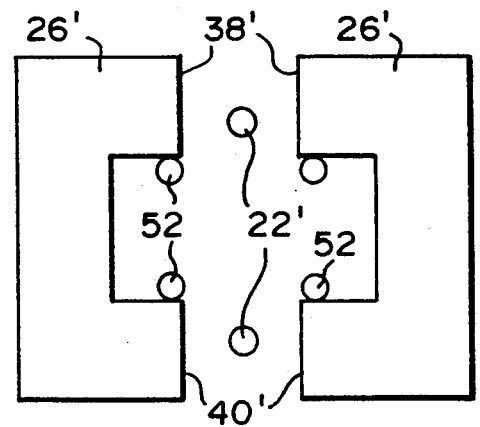
FIG. 9
FIG. 10
FIG. 11
FIG. 12

MAGNETIC BEARING AND METHOD UTILIZING MOVABLE CLOSED CONDUCTIVE LOOPS

REFERENCE TO RELATED APPLICATION

This is a continuation-in-part of U.S. patent application 07/950,607 filed Sep. 25, 1992, entitled "Passive Magnetic Bearing System and Method" now abandoned.

BACKGROUND OF THE INVENTION

This invention relates to a magnetic bearing which is self powered and self centering.

Magnetic bearings use magnetic fields rather than lubricants to support shafts and other moving objects. There is no physical contact between the stationary and moving components so there is no friction, no wear, and no lubrication. Power consumption is reduced, and such bearings have an unlimited life.

Existing magnetic bearing technology requires sophisticated electronic systems to power and position a rotating shaft. Energy storing systems are also utilized. These components require a space-consuming external unit, and the costs of the bearing systems are quite high.

Due to the complexity and expense of magnetic bearings, their use has been limited to a few very specialized applications as in space satellites and in turbomolecular vacuum pumps utilized in semiconductor manufacture.

In the railway industry, there have been proposals to support railroad cars magnetically by the utilization of interacting stationary and movable magnetic coils. The following patents are representative of such proposals:

| Powell, Jr. et al. | 3,470,828 |
| Thornton et al. | 3,768,417 |
| Fujiwara et al. | 4,779,538 |
| Fujie et al. | 4,913,059 |

An important potential use of reliable inexpensive magnetic bearings is to support energy storage flywheels which may serve in lieu of or as a supplement to batteries. Enhanced by magnetic bearings, such flywheels may be used for regenerative braking of vehicles, in electric cars, and in power supplies for laptop computers.

The objectives of this invention are to provide a magnetic bearing system which is uncomplicated, effective, reliable, and inexpensive.

SUMMARY OF THE INVENTION

According to this invention, magnetic means includes a plurality of poles formed of magnetic material, i.e. material which is magnetized or is capable of being permanently or temporarily magnetized. Each pole has a pole surface from which a magnetic field emanates. There is an object which includes a plurality of closed loops of electrically conductive material with a finite inductance and a finite conductivity (i.e. a non-superconductive conductor). The object and magnetic means are relatively rotatable about an axis of rotation so that the loop travels along a prescribed circular path relative to and through the magnetic fields located along the prescribed circular path.

The magnetic fields are positioned where they will subject the interior of the loop to magnetic flux to produce equal and opposed electromotive forces in the loop when the loop is on its prescribed circular path so that no electrical current flows in the loop. The position of the magnet means is also such that, when the loop deviates from its prescribed circular path, the magnet means will subject the interior of the loop to magnetic flux to produce unequal and opposed electromotive forces in the loop, so that an electrical current is induced in the loop. The direction of the electrical current is such that, in the presence of the magnetic field(s), it exerts a force on the loop, tending to move the loop laterally (axially and/or radially) toward the prescribed circular path.

In one embodiment, each magnet means is positioned where it provides only one magnetic field in the loop's path, and the loop has two lobes which are electrically connected together in a figure eight relationship and are offset in opposite directions from the prescribed path.

According to another embodiment of the invention, the magnet means produces first and second magnetic fields, and the loop is positioned where it is simultaneously exposed to both of these fields. The first and second fields have oppositely directed lines of flux, and these fields are at different distances from the axis of rotation or at different axial positions relative to the axis of rotation.

The magnet means preferably includes a first magnet with north and south poles facing toward the path, and a second magnet located on an opposite side of the loop's path from the first magnet. The second magnet has a north pole facing the south pole of the first magnet and the second magnet has a south pole facing the north pole of the first magnet. The first magnet has its north and south poles located at different distances from the axis of rotation and, in other instances, the first magnet has its north and south poles located at different axial positions with respect to the axis of rotation.

Adjacent magnet means are preferably spaced apart a distance of about zero to 2 D, and the dimensions of the magnet means measured parallel to the loop's path of travel is about 0.5 D to 2 D, where "D" is the length of the loop measured parallel to its prescribed path. Preferably, the magnet means is stationary, and the object which carries the loops is movable. The value of L/R is approximately equal to D/2 v where the loop has a resistance R, a length D measured parallel to the path, a self-inductance L, and a relative velocity v.

A desirable feature of the invention is the utilization of flux compression means for providing magnetic flux lines which are opposite in direction to flux lines produced by current flowing in the loop. The flux compression means is nonmagnetic and electrically conductive, and it has a surface adjacent to the loop where it is struck by flux lines produced by current flowing in the loop. The flux compression means extends along the loop's path, and its surface is positioned to face toward the loop. The flux compression means may be divided into spaced apart areas, and the spacing between the areas of the surface may either be a circumferential spacing or a radial spacing.

A loop is preferably formed of a plurality of conductors which are connected in parallel, insulated from each other, and twisted to each other.

The electrical current in the loop is reversible so it will also flow in a second opposite direction which, in the presence of the magnetic field(s), tends to move the loop laterally away from the prescribed path. However, while the loop is in the magnetic fields, the current flows for a longer time in the first direction than in the second direction.

The loop has longitudinal components with greater lengths thereof located in the fields while current flows in the first direction than while current flows in the second direction, whereby the current in the first direction causes a greater average force on the loop than the current in the second direction.

In a desired configuration where the loop has a leading leg and a trailing leg which are connected together to form the loop, relative movement of the loop through a magnetic field includes (i) a first phase which commences when a leading leg of the loop has entered the magnetic field and the trailing leg of the loop has not yet entered the magnetic field, and (ii) a second phase which commences when at least a portion of the loop's interior is in the fields, and the exposure of leading and trailing legs of the loop to the magnet means are substantially equal at a field intensity ranging from zero to a finite value, (iii) a third phase which commences when a leading leg has exited the field and the trailing leg is in the field, and (iv) a fourth phase when both the leading and trailing legs have exited the field. Due to the loop's self inductance, a first self-induced current flows in the first direction in the loop while at least a portion of the loop's interior is in the field to affect the lateral position of the loop. The self inductance also causes a second self induced current to flow in an opposite direction in the loop after all of the loop's interior has moved beyond the field. Thus, the second self-induced current is not in the presence of the magnetic field to affect the lateral position of the loop. Depending upon the relative length of the loop and magnet, the leading and trailing legs of the loop may both be in the fields during the second phase, or neither may be in the field during the second phase.

The loop may be formed of a plurality of conductors which are connected in parallel, twisted together, and insulated from each other.

The flux compression member may be a continuous annulus or cylinder, or it may be discontinuous to comprise spaced apart areas. When the areas are circumferentially discontinuous each segment will create secondary magnetic fields through which the loop moves. The magnetic field produced by current in the loop will move relative to each segment, thus inducing, in the segment, eddy currents which themselves create a magnetic field.

A secondary magnetic field can also be produced by a stationary coil aligned with one of the stationary magnets. The magnetic field from the moving loop moves relative to the coil and thus induces a current in the coil to create the secondary magnetic field. To avoid an unfavorable field which would occur if a reverse current flowed in the stationary coil, means are provided for terminating current flow in the stationary coil when the current in the stationary coil decreases to a predetermined magnitude.

Another feature of the invention is that the adjacent magnet means along the path may have different polarities so that a loop is sequentially exposed to opposite magnetic polarities. Adjacent means along the path are oppositely oriented so that, along the path, the magnetic fields of circumferentially adjacent magnet means are oppositely directed. First and second magnets can be located on an opposite side of the loop's path, facing toward each other and toward the path. The first of these opposed magnets has a north pole facing the south pole of the second magnet. The south pole of the first magnet faces the north pole of the second magnet.

Alternatively, the invention may be considered to include first and second members which respectively carry magnet means and an endless loop. The magnet means is mounted on the first member for creating two magnetic fields which have oppositely directed lines of flux. The endless loop is formed of electrically conductive material, and it is mounted on the second member. The endless loop is relatively movable into and out of the magnetic fields along a prescribed path along which the net magnetic flux is zero. The second member is laterally displaceable to divert the loop from its prescribed path to a displaced position where the net magnetic flux passing through the inner area of the loop is not zero. This induces an electrical current in the loop when the loop is moving into the magnetic fields. The direction of this electrical current, due to the presence of the magnetic fields, produces lateral relative movement between the magnet means and the loop, tending to restore the movement to the prescribed path.

Other features of the invention relate to adjustment means for varying the stiffness of the bearing system and/or for shifting the position of the object relative to the magnet poles. Bearings with these features are referred to as being "semiactive" because they include both passive magnets with constant fields and active windings or magnets which produce variations in the field strengths to which the loops are exposed. The adjustment means includes means for the current in electromagnet windings which are wound on permanent magnets of the system. Stiffness adjustments may be achieved by uniformly varying the strengths of the magnetic fields, and object-shifting adjustments can be made by nonuniformly varying the strengths of the magnetic fields so they are not equal at all of the magnets.

The axis of rotation may be tiltable from a prescribed orientation, and the magnet means and loops are so positioned that such tilting movement moves the loops away from their prescribed paths so that electrical current in the loops will tend to restore the axis to its prescribed orientation. The loops in such a tiltable system are disposed at different angles relative to the axis of rotation; all loops can be positioned equidistantly from a given point on the axis of rotation; and, each loop can be substantially perpendicular to a line which is drawn from the given point to the center of the respective loop.

The invention also involves a method whereby relative movement causes a closed self-inductive loop of electrically conductive material to travel along a prescribed path relative to and through magnetic field(s). The prescribed path is substantially circular and located around an axis of rotation. The interior of the loop is subject to equal magnetic flux from the field(s) when the loop is on its prescribed path so that the net magnetic flux is zero and no electrical current is induced in the loop. When the loop deviates from its prescribed path, the interior of the loop is subjected to unequal magnetic flux from the field(s), to induce in the loop an electrical current in a first direction which, in the presence of the magnetic field(s) exerts a force on the loop tending to move the loop laterally toward the prescribed path. Preferably, according to the method, each of the magnet means produces two magnetic fields which are at different distances from the axis of rotation or at different axial positions in relation to the axis of rotation. The two magnetic fields have oppositely directed lines of flux.

BRIEF DESCRIPTION OF THE DRAWINGS

FIG. 9 is a detail of FIG. 5, showing the presence of a stationary flux compression ring positioned between the magnets and the moving loops;

FIG. 10 is an alternative detail of FIG. 5, showing a modified flux compression member;

FIGS. 11, 12, and 13 show embodiments of the invention in which stationary coils are positioned in the air gaps of horseshoe magnets;

FIG. 16 is a front view of the bearing system, and FIG. 17 is a top view of the lower magnet assembly of this apparatus;

FIG. 19 is an upwardly looking view of the bottom of this apparatus, and FIG. 18 is a view as seen along the line 18—18 in FIG. 19.

DETAILED DESCRIPTION

Figure 1:
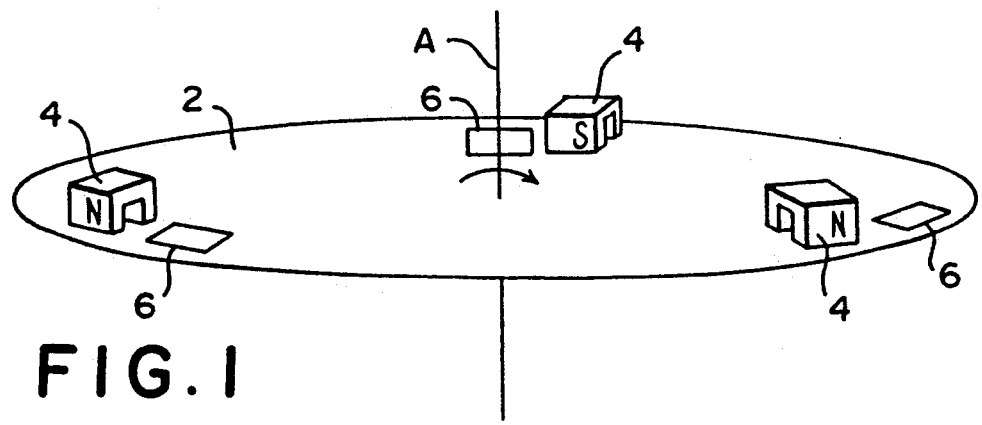
FIG. 1 is a perspective diagrammatic view illustrating the principles of the invention.

The principles of the invention will be understood from the quite simplified illustration presented in FIG. 1 where it will be seen that a rotor 2 is rotating about a vertical axis A, and that three stationary permanent magnets 4 are positioned at equiangular positions around the axis A, oriented so that their north and south poles face down toward the upper surface of the rotor 2.

The rotor carries three generally rectangular loops 6 formed of electrically conductive material. Preferably, the rotor 2 is formed of a fiber reinforced synthetic resin, and the loops are formed of "litz wire" as will be described in detail later in this specification. Each of the loops is closed (i.e. endless) and is embedded in the composite material of the rotor. Means are provided to support the rotor, and means such as gears, pulleys or direct drive motors will normally be provided to transmit rotation-producing forces to and from the rotor.

Quite remarkably, the simple structure shown in FIG. 1 is capable of centering the rotor 2 to correct any eccentricities which may occur between the center of the rotor and the axis of rotation A. This behavior is attributable to the principles which will be understood from FIG. 2 which shows a loop 6 on an object (not shown) which is designed to travel along a prescribed circular path P.

Along the path P, there is a plurality of magnet means each of which creates two magnetic fields F1 and F2 which have oppositely directed lines of flux. A simple horseshoe magnet such as 4 achieves this objective as the north pole will create the field F1 and the south pole will create the field F2 as shown in FIG. 2.

Figure 2:
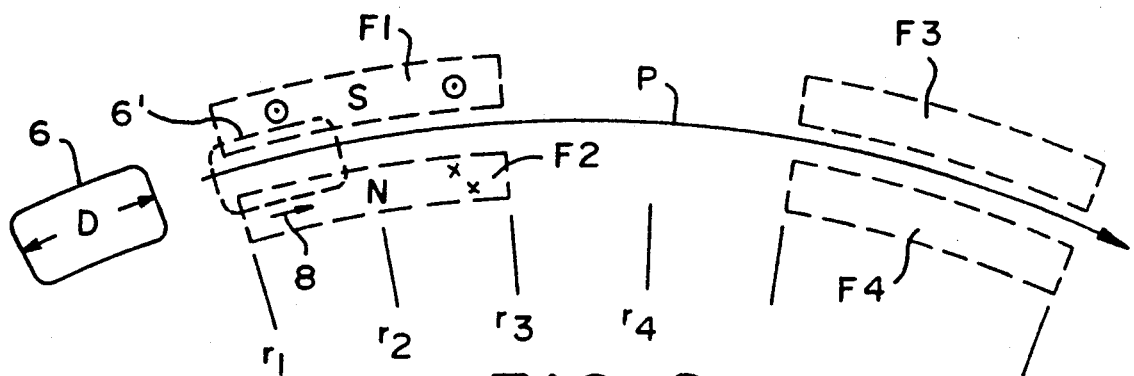
FIG. 2 is a diagram showing the progression of one of the loops through the magnetic fields encountered during operation of the apparatus.
Figure 3:
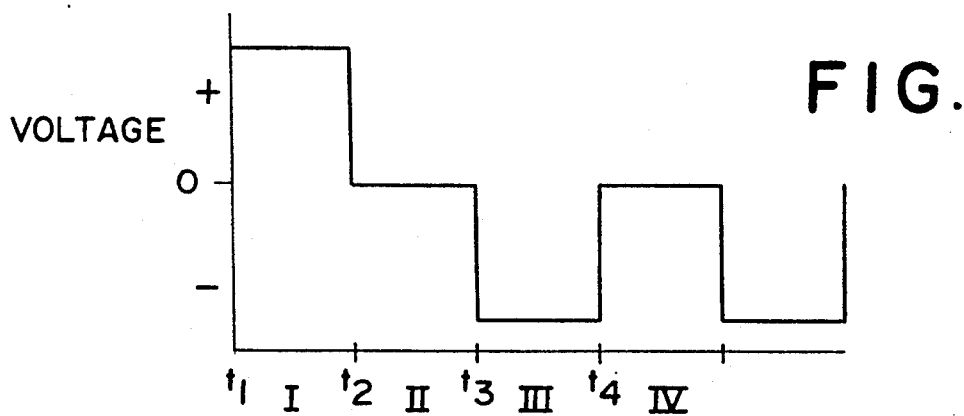
FIG. 3 is a graph which depicts the voltage in a radially displaced loop as it travels through two adjacent magnetic fields.

In the illustration of FIG. 2 it will be recognized that if the clockwise-moving loop 6 remains perfectly centered with respect to the path P during its travel, the loop will be equally exposed to both fields F1 and F2 so that there is no net flux difference attributable to either field. However, if the longitudinal centerline of the loop becomes laterally displaced from the path P, the loop will be exposed more to one field than to the other. This situation is illustrated by the broken line depiction of the loop at 6' in FIG. 2 where it has a greater exposure to field F2 than to field F1. Thus, the net flux through the interior of the loop is not zero, and an electrical current will be generated and will flow around the loop. Arrow 8 shows the current direction of this example. This current produces a magnetic field which, by virtue of basic principles of electromagnetism will be in a direction which tends to move the loop radially outwardly to a position where its longitudinal centerline will coincide with the center of the desired path P.

It will be apparent that if the loop were laterally displaced so that its exposure were greater to field F1, the current would be in a direction opposite to arrow 8, and the resulting corrective force would be in a radially inward direction.

To be more specific, the first phase of the loop travel shown in FIG. 2 occurs at t1, when the leading leg of the loop 6 passes radius r1, and enters the bipolar magnetic fields F1 and F2 of the magnet. If the central longitudinal axis of the loop is radially shifted off center from the prescribed path P, the leading leg will experience a net voltage, thus producing a loop current which will create a centering force on the loop and the object to which it is attached. Because the circumferential length of the loop in the field is largest as the loop current reaches its maximum value, the average force is large as it is a product of the loop length, the loop current, and the bipolar magnetic field strength. This force is larger than the average force that occurs when the loop leaves the bipolar magnetic fields, as will be described below.

During phase II, both the leading and trailing legs of the loop 6 are in the magnetic fields in the illustrated embodiment where the longitudinal dimension of the fields F1 and F2 is greater than the longitudinal dimension of the loop. This phase starts at time t2 when the leading leg of the loop passes radius r2 and the trailing leg of the loop passes r1. Because of the magnetic energy stored in the loop from phase I, a current still flows throughout phase II in the direction of arrow 8 which produces a centering force on the loop and the object which carries it. Correction is not necessarily immediate, as a loop must usually pass through many fields before correction is complete.

Phase III commences at t3 when the leading leg of the loop passes r3. The leading leg is outside the fields and the trailing leg is inside the fields. This creates a current which would interact with the bipolar magnetic field to create an off-centering force on the loop; however, due to the magnetic energy still remaining from phase I due to the self-inductance of the loop, a current flows from the beginning of Phase III which still corrects for off-path displacement. This current produces a large average force because the circumferential length of the loop immersed in the bipolar magnetic field is large at this point in time.

About midway through Phase III, the current in the loop 6 falls below zero, thus marking the end of the stored magnetic energy carried over from phase I. The loop current reverses direction to create a destablizing force on the rotor, but this destablizing force is much lower than the average correcting force during phase I because the reversed current of phase III occurs while the length of the loop in the bipolar field is smaller, on average, than during phase I.

Phase IV commences when the trailing leg of the loop 6 exits the fields F1 and F2. In the illustrated embodiment where the magnet length is twice the loop length, this phase occurs at t4 when the leading leg passes radius r4. During phase IV, the magnetic energy stored during phase III creates a current but it does not interact with an external magnetic field and thus does not produce any radial force. The magnetic energy stored from phase III collapses to about half of its maximum value at the end of this phase.

Continued movement of the loop 6 carries it into the fields F3 and F4 of another bipolar magnet which, as shown in FIG. 2, are preferably of polarities which are opposite to the previous fields F1 and F2. The downstream magnet which creates the fields F3 and F4 is oppositely oriented in a lateral sense with respect to the magnet which creates the fields F1 and F2 so that, on each side of the prescribed path P, the magnetic fields of successive magnets are oppositely directed. Thus, the residual current of the previous phase acts together with the new bipolar magnetic fields to give a correcting force on the loop.

Integration of the radial forces over all four phases reveals that there is a net corrective force on the loop. Corrections occur during phase I, phase II, and during the initial portion of phase III. A destablizing force occurs during the latter portion of phase III. Phase IV provides no correcting force.

The geometrical relationship between the components may vary significantly from what is shown in FIG. 2. The loop 6 may be of any configuration, the longitudinal/circumferential dimensions of the magnets and their respective fields may range from one half to two times the loop length D, and the circumferential field-to-field spacing may range from zero to two times the loop length D.

In a situation where the longitudinal dimension of the magnetic fields is equal to the longitudinal dimension of the loop 6, the duration of the second phase is substantially instantaneous. When the length of the loop is greater than the length of the magnetic fields, the second phase commences when the leading leg leaves the fields and terminates when the trailing leg enters the fields. In the FIG. 2 embodiment where the field length is twice the loop length, the second phase commences when the trailing leg enters the fields F1 and F2 and it terminates when the leading leg exits these fields.

For optimal performance, the ratio of the inductance to resistance of the loop, i.e. the inductive time constant, is chosen to match one-half the minimum time required to complete one phase at maximum loop speed. This can be expressed mathematically by the formula $L/R \sim D/2v$ where L is the self-inductance of the loop, R is the resistance of the loop, D is the longitudinal dimension of the loop with respect to the path P and v is the maximum operating speed of the loop.

From the foregoing formula, it will be recognized that it is desirable to reduce the self-inductance of the loop, particularly as loop speed increases. This can be done using various techniques including (1) forming the loop of a single turn of wire, (2) providing electrically conductive flux compression members which have surfaces facing the loops to "compress" the loop's magnetic flux, and/or (3) providing the stationary coils along the path in which currents are induced to create an opposing magnetic flux.

A more complete assembly which includes axial and radial bearings is shown in diagrammatic form in FIGS. 5-8. It has a housing with a cylindrical body 12 and annular end walls 14 of nonmagnetic material such as aluminum.

Figure 5:
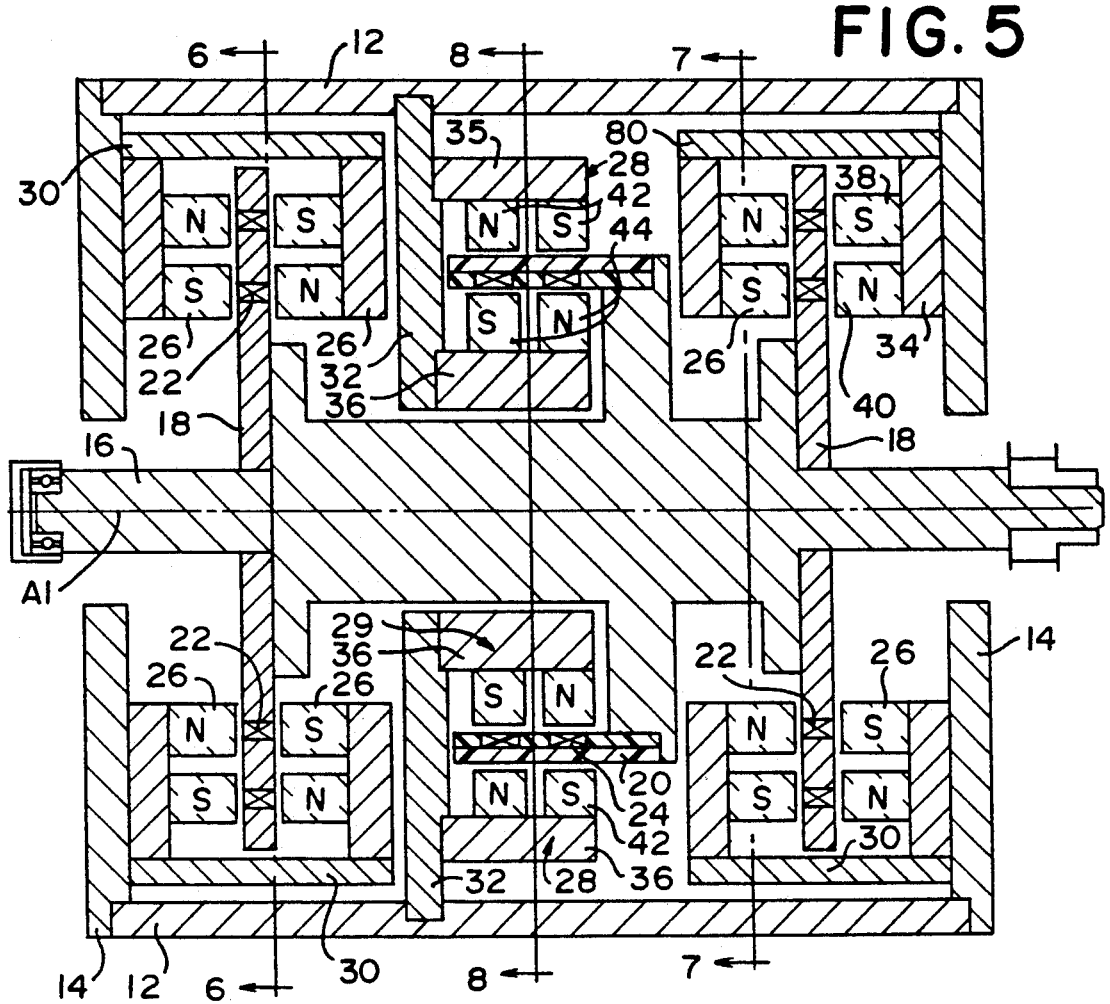
FIG. 5 is a sectional view of a preferred embodiment of the invention in which a rotating object is centered both in a radial sense and in an axial sense.

A rotating shaft 16 is rigidly connected to and supports two loop-carrying disks 18 and one loop-carrying cylinder 20. These members 18 and 20 are made of nonmagnetic materials such as fiber reinforced polyester or epoxy, and each carries a plurality of electrically conductive loops 22, 24 which travel in orbital paths which are concentric with the rotational axis A1 when the apparatus is in operation. As shown in FIG. 5, the cylinder 20 is formed of an internal cylindrical piece in which the loops 24 are embedded, and an external cylindrical piece which enhances the strength and dimensional stability of the cylinder 20.

Magnets 26, 28 and 29 which react with the loops are supported on the interior of the housing by segmental support pieces 30, 32 made of nonmagnetic material such as aluminum. Each magnet includes a ferromagnetic base 34, 35, 36 and two rare earth magnet pieces 38, 40, 42, 44 adhesively bonded thereto, thus forming a horseshoe magnet which has its north and south poles positioned in a same circumferential position of the prescribed circular path of the reacting loops 22, 24. These poles face the path at positions where laterally opposed segments of a loop are simultaneously exposed respectively to first and second magnetic fields which are oppositely directed.

For the radial bearings, each magnet 26 includes a base 34, an outer magnet piece 38, and an inner magnet piece 40. For the axial bearing, there are outside magnets 28 each formed of a base 35 and pieces 42, and inside magnets 29 each formed of a base 36 and pieces 44.

The disks 18 and magnets 26 act as radial bearings which provide radial corrections which bring the shaft axis A1 into coincidence with the desired axis of rotation, thereby moving the loops 22 toward their prescribed paths in a radial sense.

Figure 8:
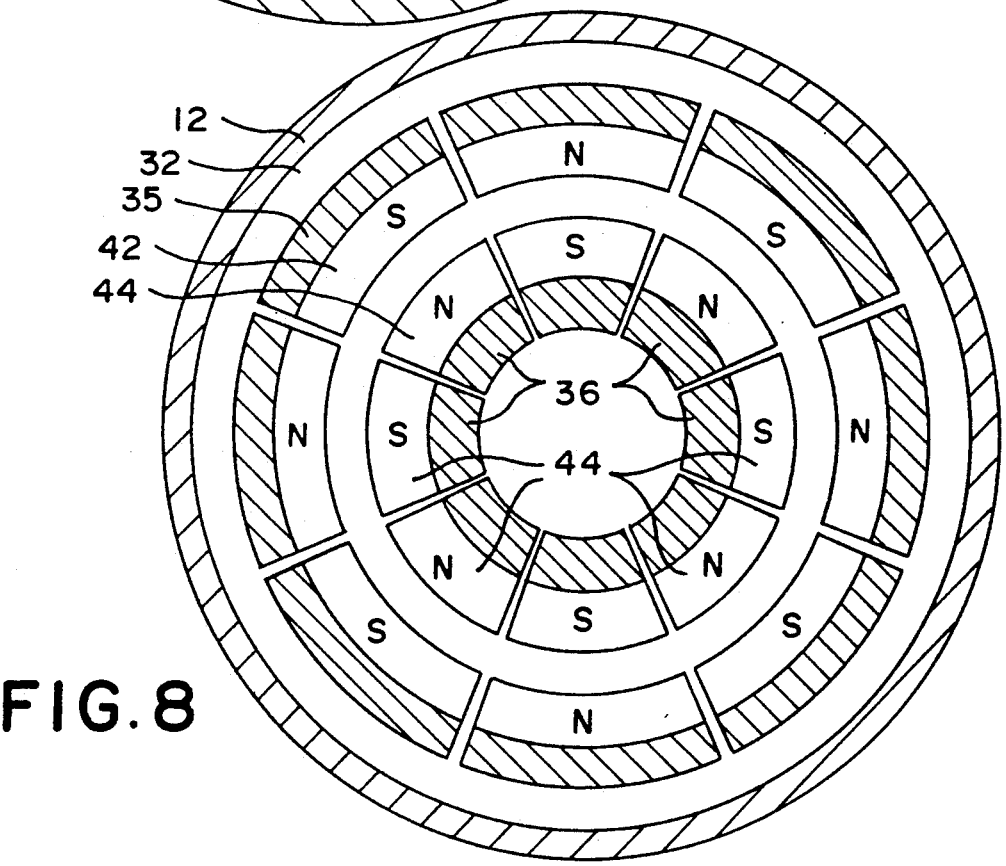
FIG. 8 is a sectional view taken along line 8—8 in FIG. 7, showing the magnets in the axial bearing.

Axial positioning of the shaft 16 is provided by the loops 24 in the cylindrical member 20 and the associated magnets 28 and 29. The arrangement of these magnets is shown in FIG. 8, where the shaft and loop-carrying cylinder have been omitted for clarity. Their principle of operation is identical to that described for the radial positioning of the loops in connection with FIG. 1 but these loops 24, being located in axial planes rather than radial planes, will tend to move the shaft 16 in an axial direction so that the loops will follow their prescribed paths in an axial sense.

Figure 6:
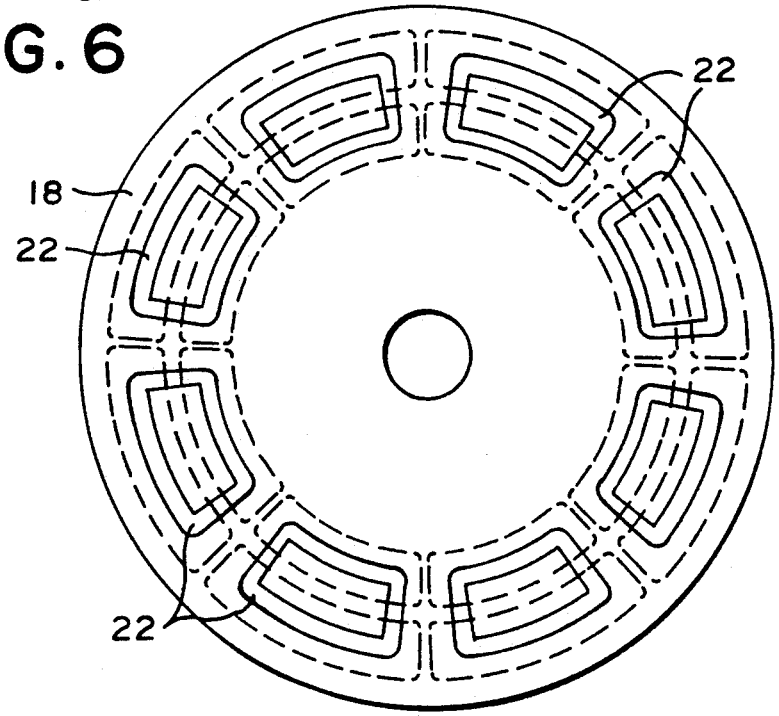
FIG. 6 is a sectional view as seen along the line 6—6 in FIG. 5, showing a face of a rotating disk of the radial bearing.
Figure 7:
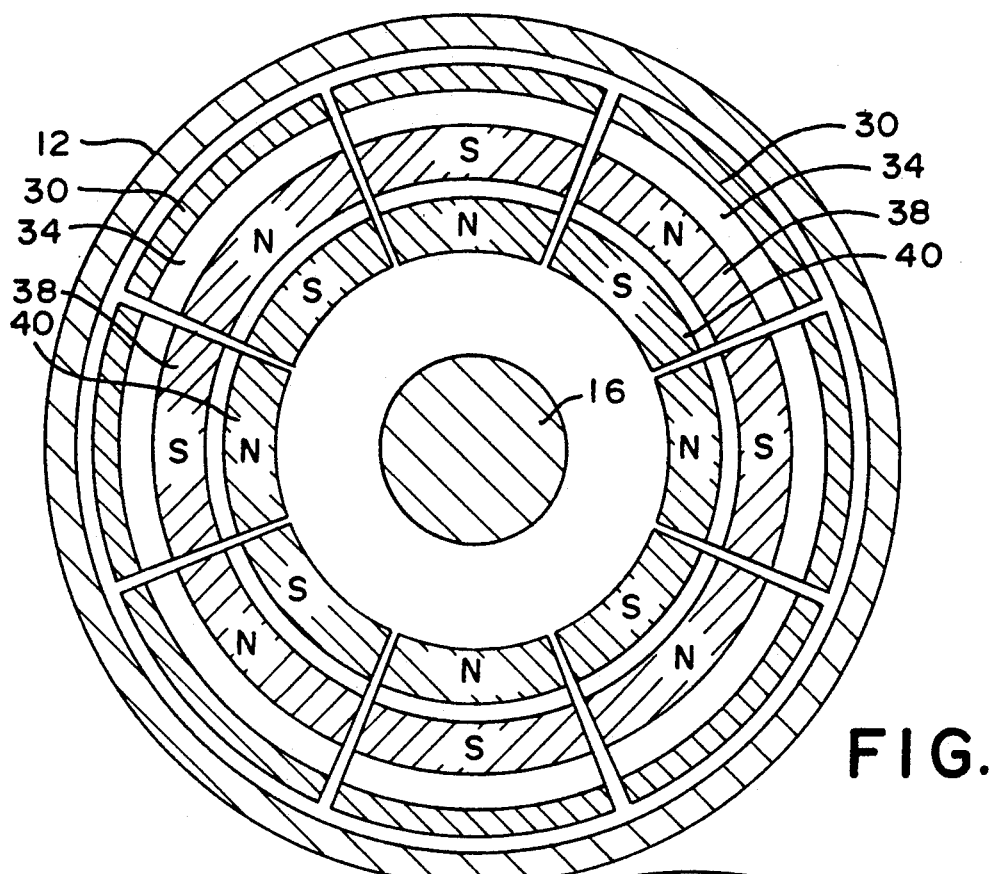
FIG. 7 is a sectional view taken along line 7—7 in FIG. 5, showing the positions of the magnets in the radial bearing.

FIG. 6 shows the face of a disk 18 which carries the radial correction loops 22. Broken lines have been superimposed on this drawing to illustrate the locations of the pole faces and fields of the stationary magnets pieces 38 and 40. Each loop 22 may be a unitary piece of solid electrically conductive material, but preferably it is made up of a plurality of electrical conductors which are electrically insulated from each other and are electrically connected together in parallel. One such wire, known as a litz wire, is constructed of individual film-insulated wires which are bunched or braided together in a uniform pattern of twists and length of lay. This configuration reduces skin effect power losses of solid conductors, or the tendency of radio frequency current to be concentrated at the conductor surface. Properly constructed litz wires have individual strands each positioned in a uniform pattern moving from the center to the outside and back within a given length of the wire.

The apparatus of FIG. 5 includes flux compression members with surfaces facing the loops. These components are illustrated in FIG. 9. They cause flux compression because changing loop currents induce oppositely directed "image" currents in any conductive material near the loop. The magnetic fields of these two oppositely directed currents nearly cancel each other, thereby reducing the magnetic flux of the loop per unit current.

Flux compression members are shown at 48 in FIG. 9. They are positioned in the air gap between the disk 18 and the poles of magnet pieces 38 and 40. The flux compression members are made of copper or other suitable electrically conductive nonmagnetic material. Each has a surface positioned adjacent to the loop 22 so it will be struck by flux lines produced by current flowing in the loop. Eddy currents are thus produced in the flux compression members 48, and these currents provide magnetic flux lines which are opposite in direction to the flux lines produced by current flowing in the loop 22, thereby reducing the self-inductance of the loop and increasing the effectiveness of the apparatus.

The flux compression members 48 are stationary. Each may be a full annulus, or it can be circumferentially discontinuous, formed of a number of segments, each of which lies in the annular area, but is circumferentially spaced from identical adjacent segmented flux compression members. In such an arrangement, each flux compression segment preferably is circumferentially coextensive with a respective magnet.

Figure 4:
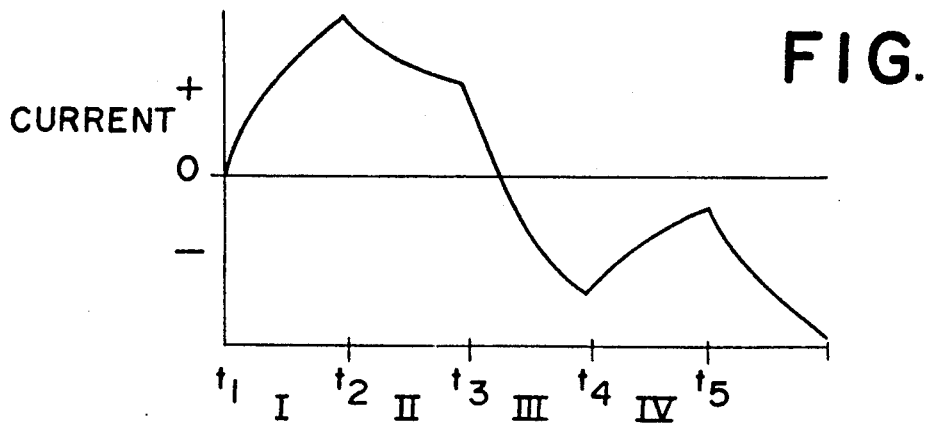
FIG. 4 is a graph which depicts the current in a radially displaced loop as it travels through two adjacent magnetic fields.

When the loop 22 deviates from its prescribed circular path, the magnets 26 induce a current in the moving loop 22 which, in effect, turns the loop into a moving magnet. Large eddy currents are induced in the nearby flux compression member 48 by virtue of (a) the current changes of the type shown in FIG. 4 which are occurring in the moving loop and (b) the movement between the magnetic field of loop 22 and the flux compression members 48. The moving magnetic field of the displaced loop 22 induces a repulsive force in the flux compression member 48 that it is closer to, and this repulsive force is stronger than the repulsive force from the more distant flux compression member. The net force urges the moving loop 22 axially back toward its prescribed path where the repulsive forces are equal. There are no currents or forces unless there is a displacement, so drag is significantly reduced.

Flux compression means are also desirable for the axial bearing. Two cylindrical flux compression members may be positioned in the two cylindrical air gaps, and these flux compression members can be (a) complete cylinders (b) circumferentially spaced cylinder segments which are positioned in alignment with the respective magnets 28. In either case, the flux compression members reduce the self inductance of the loops by creating a magnetic field which opposes the magnetic field produced by current flowing in the individual loops.

In the embodiment shown in FIG. 9, the repulsive forces on the loops 22 do not have any effect on the radial positioning of the rotor. The flux compression members 48 are flat, so all repulsive forces are directed axially, not radially. Likewise, a purely cylindrical or circumferentially segmented cylindrical flux compression member associated with the loops 24 and magnets 28 will provide radial but not axial repulsive forces.

A modified flux compression member shown in FIG. 10 has a configuration which will assist the radial positioning of the rotor. It is formed of three concentric rings 50a, 50b, and 50c which are respectively located outboard of, between, and inboard of the magnet pieces 38 and 40. These rings may be circumferentially segmented or circumferentially whole, and they extend axially beyond the pole surfaces of the magnet toward the loop path, so as to present radially facing surfaces and axially facing surfaces. Repulsive forces emanating from these surfaces will have radial components which repel the loops, thus assisting the interacting loops 22 and magnets 26 to position the rotational axis and loop path in radial directions. In the axial bearing, axial positioning of the rotor can be enhanced by a flux compression member made of three axially spaced rings of equal diameters, positioned axially between and axially outboard of the magnet poles 38 and 40.

Figure 10A:
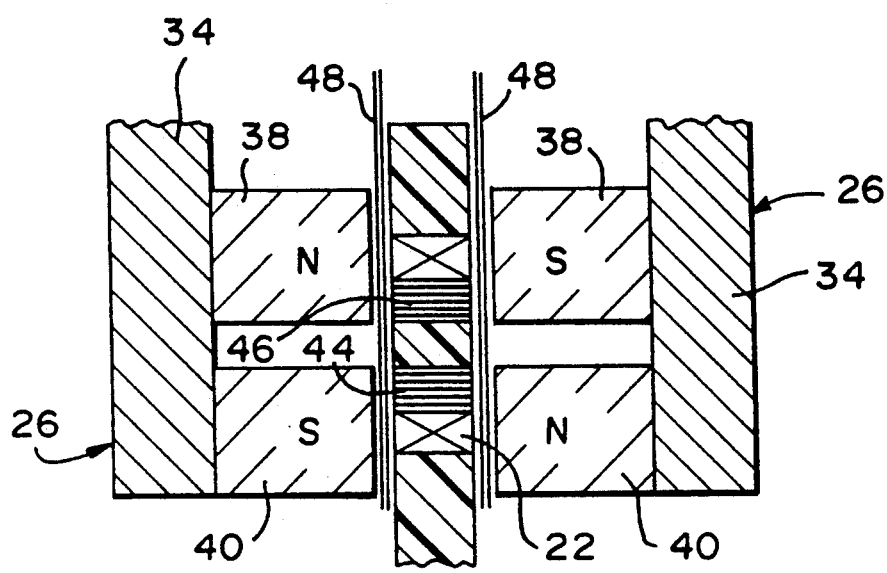
FIG. 10a shows an embodiment of the invention which has iron cores in the moving loops.

FIG. 10a shows iron core pieces 44 and 46 are positioned inside each loop 22, each core piece being associated with a respective one of the two magnetic poles 38, 40 and fields to which the loop is exposed simultaneously. The core pieces are formed of stacked parallel circumferentially oriented iron laminations of the type used conventionally in transformers and other inductive devices. These core pieces are separated by a space filled with nonmagnetic disk material. It is believed that, by providing such core pieces 45 and 46, the efficiency of the device will be increased because there will be a greater corrective force per unit of current than would exist without core pieces. Also, the core pieces make it possible to use a smaller air gap in order to reduce the size and cost of the permanent magnet pieces.

Another enhancement to and in the structure of FIG. 5 involves the addition of current amplification coils of the type shown schematically in FIGS. 11 and 12. Two stationary coils 52 are located in the air spaces between the pole pieces 38' and 40' of the bipolar magnets 26'. When the moving loop 22' deviates from its prescribed path, the magnets will induce a net emf in the moving loop. A current will flow in the loop 22', and the interaction of this current with the fields from the stationary magnets will tend to move the loop laterally toward its prescribed path, as previously described.

While current is flowing in the moving loop 22', it creates a magnetic field which moves, with the loop, relative to the space of the stationary coils. The magnetic field from the moving loop induces, in the stationary coils 52, a current which is opposite in direction from the current in the moving loop 22'. This current in the stationary coils, in turn, produces magnetic fields which induce an increase in the moving loop's current to increase the overall effectiveness of the bearing system.

The magnetic fluxes of the moving loop and stationary coils partially cancel each other, so there is a flux compression effect which further increases the magnitude of the currents. In this respect, the surfaces of the coils 52 are adjacent to the moving loop so as to be struck by flux lines produced by current flowing in the loop.

The flux compression effect inherently results in repulsive forces between the stationary coils 52 and the moving loop 22'. These forces are proportional to the current. As can be seen in FIG. 12, such repulsive forces will tend to move the moving loop laterally toward its prescribed path.

The stationary coils 52 will have a detrimental effect after the moving loop 22' begins to move past the stationary coils. The emfs will reverse and eventually the current will change to an unfavorable direction unless countermeasures are taken. One way of minimizing this is to construct the stationary coils 52 of conductors which provide a self inductance which is slightly lower than that of the moving loop by, for example, constructing the moving loop with two turns of wire connected in series; and winding the stationary coil with a single turn of wire.

Alternatively, means should be provided for terminating current flow in the stationary coils 52 when the moving loop 22' begins to leave the fields of the permanent magnet 26' or, more precisely, when the currents in the stationary coils decrease to a predetermined magnitude, preferably zero, and before they reverse direction. Electronic switches or commutators can be used to achieve this.

Figure 13:
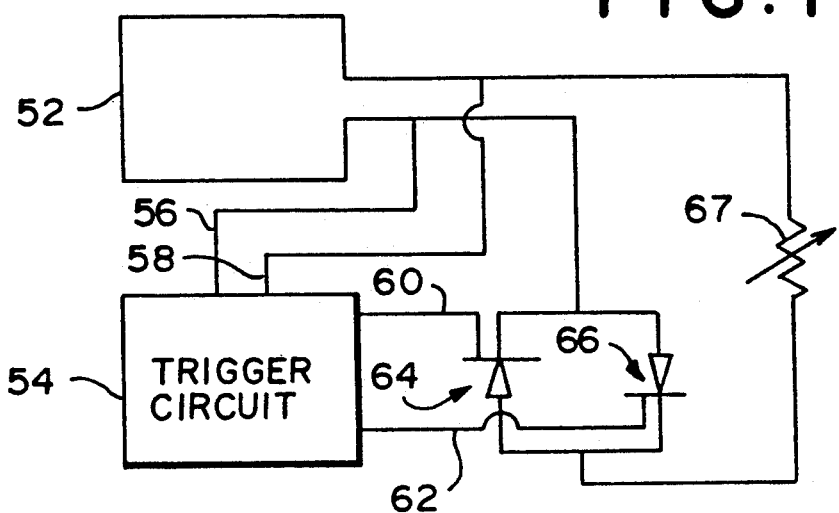

An electronic commutation circuit is shown in FIG. 13. It includes a trigger circuit 54 which has sensing leads 56 and 58 connected across the stationary coil 52, and two output lines 60 and 62 connected to two oppositely oriented silicon controlled rectifiers ("SCRs") 64 and 66 as shown. The trigger circuit includes a discriminator or other threshold device which will trigger one of the SCRs, selected according to polarity, when the voltage across leads 56 and 58 reaches the threshold value.

When the moving loops are centered on their prescribed path, the voltage across the leads 56 and 58 will be zero and both SCRs will be in a nonconducting state. However, when the moving loops deviate laterally from their prescribed path a distance sufficient to create inductively, in stationary loop 52, an electromotive force which exceeds the threshold value of the trigger circuit 54, the circuit will trigger one of the SCRs 64 or 66 to close the endless loop circuit which includes the stationary coil 52. The polarity of the electromotive force will determine which one of the SCRs goes to its conducting state. The conducting SCR will continue to conduct until the current falls to zero, at which time the SCR will inherently go to its nonconducting condition.

In some situations, it is desirable to adjust the stiffness of a magnetic bearing. In the embodiment shown in FIGS. 11-13, the bearing's stiffness is adjustable by controlling the current in each of the stationary coils 52. A variable resistor 67 or other suitable current-controlling device is connected in series with the coil 52. By increasing the resistance of the resistor 67, the current in the coil 52 is reduced thus also reducing the strength of the secondary magnetic field produced by this current. It will be recognized that this will also reduce the stiffness of the bearing.

Some general observations can now be made with regard to the principles utilized in the various embodiments of the invention. In all embodiments, there is a voltage induced in the moving loop during rotor displacements due to net flux from the external magnets entering the interior of the loop. When circumferentially continuous flux compression members are added, there is a second voltage induced in the displaced loop due to flux compression member currents and thus magnetic fields changing in time near the loop. Finally, when the flux compression members are stationary coils (FIGS. 11 and 12) or are circumferentially discontinuous segments (FIG. 9), a third voltage is induced in the moving loop during rotor displacement. This voltage is produced by the relative motion of the loop through the magnetic field of the coil or segment, a field which was itself created by electromagnetic interactions with the moving loop. This third process mirrors the operation of a self-excited generator in that the loop and coil (or segment) currents are both amplified due to the change in their mutual inductance with relative rotation.

In view of the analysis presented in the preceding paragraph, it will be recognized that circumferentially discontinuous flux compression members 48 and stationary coils 52 serve as means for creating secondary magnetic fields through which the respective loops 22 and 22' move. The stationary members 48 and 52 are located near the loop path so that magnetic fields produced by current in the loop 22 or 22' will move relative to the respective member 48 or 52, thus inducing a current in the member 48 or 52 to create the secondary magnetic field.

More detailed explanations of the principles of flux compression and current amplification are provided in U.S. Pat. No. 4,200,831 of Weldon et al., and in Publication PR-74 of the Center of Electromechanics, The University of Texas at Austin, Balcones Research Center, EME 1.100, Building 133, Austin, Tex. 78 758-4497. Both are incorporated herein by reference. The latter is a paper entitled "Compulsator Research at The University of Texas—an Overview" by Spann et al., presented at the 4th Symposium on Electromagnetic Launch Technology, Apr. 12-14, 1988.

Figure 14:
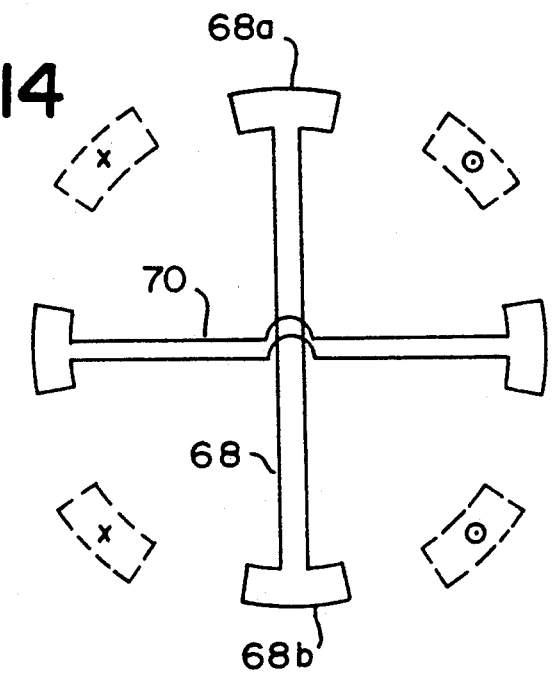
FIG. 14 shows an embodiment of the invention in which a moving loop reacts simultaneously with circumferentially spaced magnets.

The embodiment of FIG. 14 includes a rotor with loops positioned so that portions of a single loop are on diametrically opposite sides of the rotor. Here, a first loop 68 has a portion 68a diametrically opposed from portion 68b and these portions are connected together by conductors which extend generally in a diametrical direction. A second loop 70 is similarly constructed and is displaced ninety degrees from the orientation of the first loop. In this type of construction, the magnets are arranged so that each loop will have its opposite segments simultaneously exposed to two magnetic fields which have oppositely directed lines of flux. In an alternative arrangement (not shown), the diametrically opposed magnets have the same polarity, and the diametrically opposite loop portions are electrically cross-connected so that rotor eccentricity will cause the loop current to flow in one direction.

Figure 15:
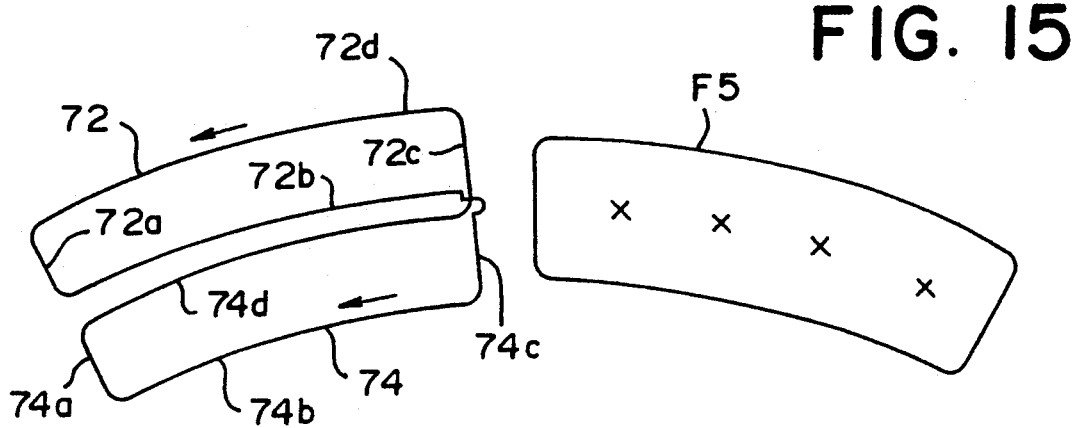
FIG. 15 shows an embodiment in which a moving loop reacts with only one field of a stationary magnet to create centering forces.

FIG. 15 shows an arrangement in which a single loop reacts with single magnetic fields to provide centering forces on the rotor. In this case, each magnetic field F5 is rectangular and each loop is formed of two lobes which are offset in opposite directions from the prescribed path and are electrically connected in a figure-eight configuration. The outboard lobe 72 is formed by elements 72a, 72b, 72c and 72d, and the inboard lobe 74 is formed by elements 74a, 74b, 74c and 74d. If the loop deviates from the prescribed path in an inboard direction, the outboard lobe 72 will have a greater exposure to the magnetic field F5 than the inboard lobe 74, causing current to flow in the direction of arrows 76. This current will produce a travelling magnetic field which reacts with the field F5 to bias the loop and its carrier toward their desired circular path of movement.

One technique for adjusting the stiffness of a magnetic bearing was described above in connection with FIG. 13 where the current was adjusted in the stationary coils 52. Another way to adjust the stiffness of the bearing is to vary the strength of the magnets, preferably by providing each magnet with electromagnet windings which, when energized, will augment or counteract the permanent magnetic field of the respective magnet.

Figure 17:
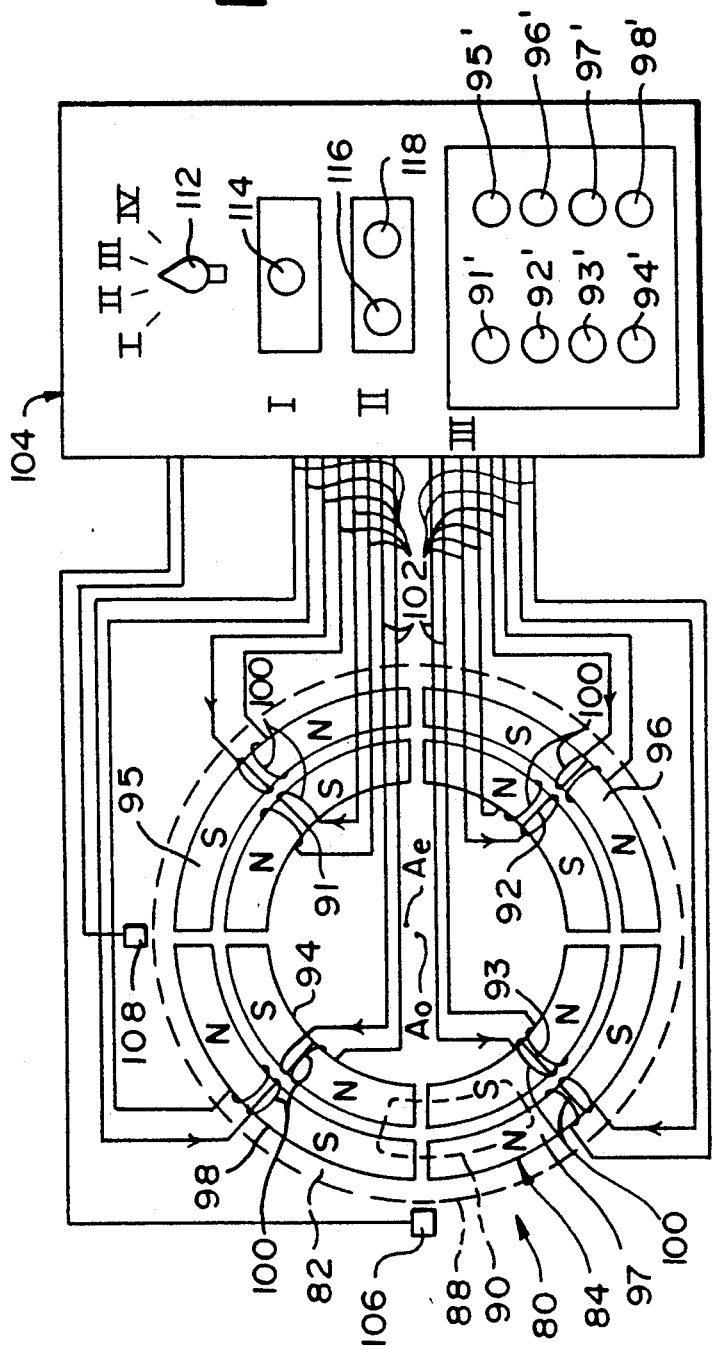
FIGS. 16 and 17 are diagrammatic views of an embodiment of the invention which permits adjustments in the stiffness of the bearing and/or the position of the axis of rotation.
Figure 20:
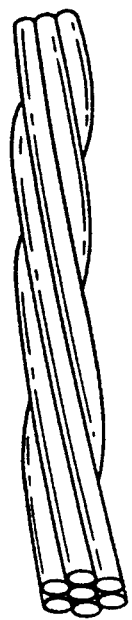
FIG. 20 shows a twisted wire which is suitable for forming the loops in apparatus according to the invention.
Figure 16:
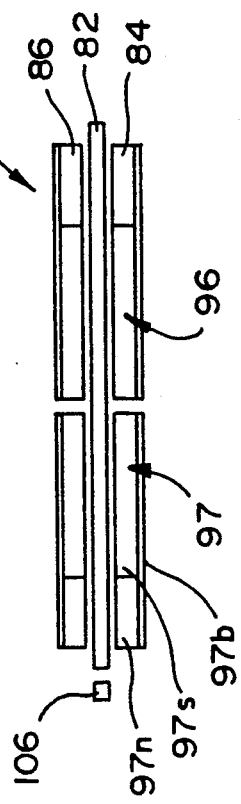

FIGS. 16 and 17 show, in diagrammatic form, a radial bearing 80 which, in one mode of operation, utilizes supplemental electromagnet windings for stiffness control. These windings have been omitted from FIG. 16 for ease of understanding. In this embodiment, position adjustments are performed by varying the relative strengths of radially adjacent axially-facing poles. One such pair of poles is the south pole of magnet 95 and the north pole of magnet 91. The flux lines from these two poles are oppositely directed in an axial sense, as the flux lines from the north pole will be directed out of the paper and toward a viewer of FIG. 17, and the flux lines to the south pole will be directed into the paper and away from such a viewer.

The bearing 80 has a horizontal rotor 82 located between a lower magnet assembly 84 and an upper magnet assembly 86. In this illustrative embodiment, each magnet assembly has only eight magnets, but sixteen or more may be used.

FIG. 17 includes a downward-looking view of the lower magnet assembly 84, in which broken lines are provided to show the axially projected locations of the rotor perimeter 88 and one loop 90 of the eight loops on the rotor 82. Each magnet assembly has four inboard magnets 91, 92, 93 and 94; and, four outboard magnets 95, 96, 97 and 98.

As can be seen in FIG. 16, each magnet is formed of two premagnetized magnet pieces such as 97n and 97s which are bonded to a back iron 97b. One piece 97n has its north pole surface facing the rotor 82, and the other piece 97s has its south pole surface facing the rotor 82. As shown in FIG. 17, each magnet is oriented so that its opposite poles are spaced circumferentially from each other, in contrast to the radial spacing of the magnet poles as shown in FIG. 1. FIG. 17 shows the magnets arranged so that a radial line from the axis of rotation $A_o$ will intersect two radially spaced pole faces of opposite polarities. Each of the inboard magnets 91-94 has its south pole located clockwise from its north pole; and, each of the outboard magnets 95-98 has its north pole located clockwise of its south pole.

As shown in FIG. 17, electromagnet windings such as insulated electrical wires 100 are wound around the respective magnets. These windings are connected by conductors 102 to a power supply 104. Each of the windings is wound in a direction so that the strength of the magnetic field of its respective magnet will be increased when the windings are energized by a current which flows in the direction indicated by an arrowhead on one of its respective conductors. Thus, to increase the stiffness of the bearing system, the power supply increases the currents flowing in the directions of the arrowheads. Conversely, reduction of these currents will reduce the bearing stiffness. Negative currents, i.e. currents in directions opposite to the arrowhead directions, will further decrease the magnetic field strengths and further reduce the stiffness of the bearing. Assuming that each of the windings has the same number of turns, uniform current changes will provide stiffness adjustments without causing any shifting of the position of the axis of rotation.

In addition to or in lieu of stiffness adjustment, the bearing system of FIG. 17 is operable to control the position of the rotor's axis of rotation so that it will be eccentric to the central axis $A_o$ of the magnet assembly. Such position adjusting is done by nonuniformly varying the strengths of the magnets in each magnet assembly. For example, shifting of the rotational axis $A_o$ toward an eccentric position $A_e$ shown in FIG. 17 can be achieved by (1) decreasing the strength of magnet 95, (2) increasing the strength of magnet 91, (3) decreasing the strength of magnet 93, (4) increasing the strength of magnet 97, or (5) performing two, three, or all four of these adjustments. In each case, there inherently is a nonuniform variation in the strengths of the magnetic fields associated with two radially spaced poles which provide flux lines which are oppositely directed in an axial sense.

In still another mode of operation, the currents in the windings of magnets 91-98 can come under automatic control of signals from stationary proximity sensors 106 and 108 which face the circular perimeter 88 of the rotor 82. When the x-axis sensor 106 detects that the rotor has drifted toward it, the sensor sends a signal to the power supply. In response to this signal, the currents in the windings of magnets 91, 92, 97 and 98 are increased, and the currents in the windings of magnets 93, 94, 95 and 96 are decreased. This strengthens the fields of magnets 91, 92, 97 and 98 and it weakens the fields of magnets 93, 94, 95 and 96. These changes tend to move the axis of rotor 82 toward its prescribed position $A_o$. Opposite actions occur when the rotor drifts away from the x-axis sensor and, again, they tend to move the rotor toward its prescribed position $A_o$.

The controls responsive to the y-axis sensor 108 have a similar effect, as they provide signals which are used to supplement the passive rotor-centering effect in the y-axis direction. When the rotor moves too close to the sensor 108, the fields of the magnets 92, 93, 95 and 98 are strengthened and/or the fields of the magnets 91, 94, 96 and 97 are weakened. When the rotor moves too far from the sensor 108, the fields of the magnets 92, 93, 95 and 98 are weakened and the fields of the magnets 91, 94, 96 and 97 are strengthened.

A particular advantage of the automatic control mode is that is enhances the stiffness of the bearing over a system employing permanent magnets alone.

The control panel for the power supply 104 can be arranged in many ways. In the illustrated embodiment, there is a four-position mode selection switch 112 which permits selection of any one of the following modes:

Mode I: uniform magnet strength adjustment for stiffness control;

Mode II: nonuniform magnet strength adjustment for axis position control;

Mode III: individual magnet strength control for stiffness and/or axis position control; or, Mode IV: automatic enhanced axis position control (responsive to sensors 106 and 108).

When Mode I is selected, a single knob 114 can be used to effect uniform changes in the currents in all of the windings of magnets 91–98. In Mode II, the operator may turn an x-axis knob 116 and/or a y-axis knob 118 to change the currents and magnet strengths to shift the axis of rotation. Mode III permits the operator to use knobs 91', 92', 93', 94', 95', 96', 97' and 98' to make individual magnet-by-magnet current/strength adjustments to obtain a desired balance of stiffness and/or axis position. When Mode IV is selected, the enhanced positioning/stiffening system with sensors 106 and 108 is placed in operation. The settings of I, II and III would remain in their adjusted positions when the automatic Mode IV is selected.

Figure 18:
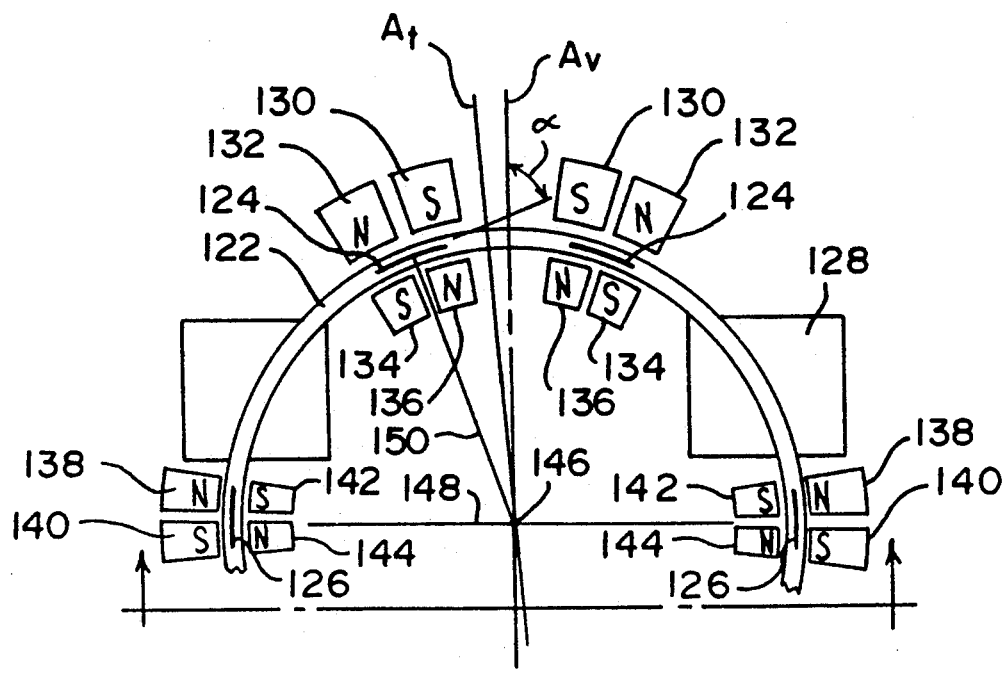
FIGS. 18 and 19 are diagrammatic views of an embodiment in which the rotational axis is tiltable.
Figure 19:
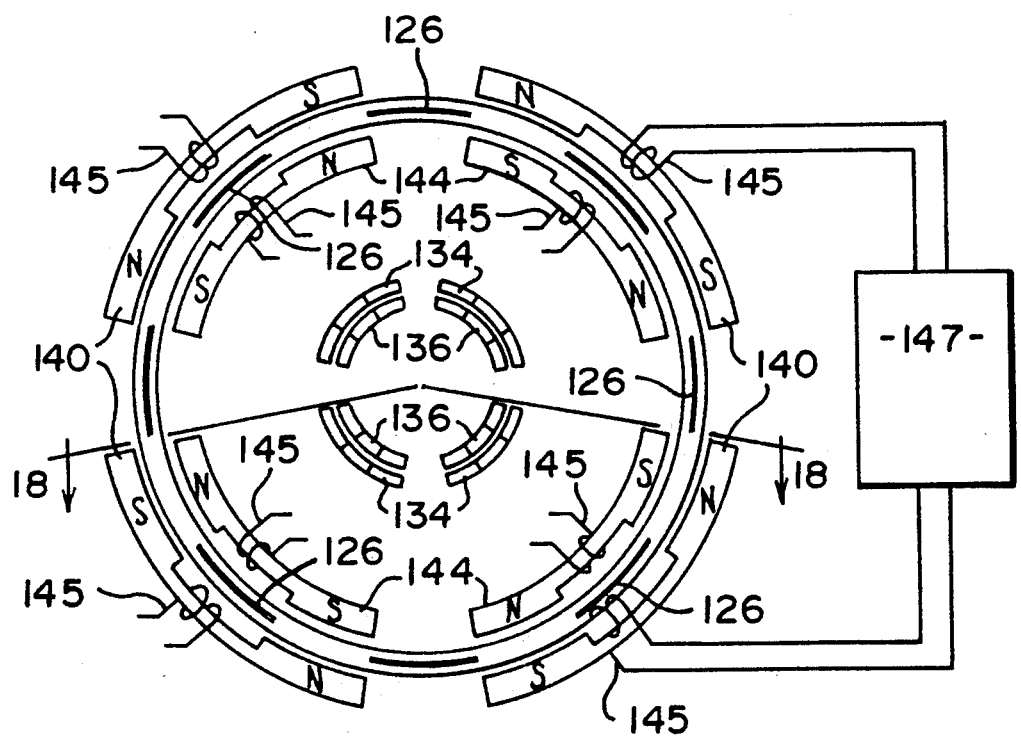

Another embodiment of the invention, shown in FIGS. 18 and 19, is a bearing system with a tiltable axis of rotation. In FIG. 18, the normal vertical axis of rotation is designated $A_v$, and a tilted axis of rotation is shown at $A_t$.

The rotor 122 in this instance is a nonmagnetic hemispherical body which carries closed electrically conductive loops. An upper set of these loops 124 is arranged in a circular row, and a lower set of loops 126 is also arranged in a circular row. Each loop 124 is in a plane which intersects the axis $A_v$ at an angle $\alpha$ which is from 45° to 90°. Each loop 126 is in a plane which parallel to the axis $A_v$, so the angle $\beta$ between the axis $A_v$ and the plane of the loop 126 is zero. This angle $\beta$ can be from 0° to 45°. An annular mass 128 is mounted on the rotor to increase its moment of inertia for flywheel purposes.

The rotor 122 is levitated and positioned by two sets of magnets. Each set has four circular rows of magnets arranged in two side-by-side circular rows of magnets located inside the volume of the hemispherical rotor, and two side-by-side circular rows of magnets located outside the volume of the hemispherical rotor. Each magnet has its north and south poles circumferentially offset from each other. The magnets in adjacent rows are arranged so that opposite lateral portions of a loop on the rotor will simultaneously be exposed to opposite magnetic fields.

Axial levitation and radial positioning of the rotor 122 is produced by the upper set of magnets 130, 132, 134 and 136 arranged in respective circular rows; whereas the lower set comprises rows of magnets 138, 140, 142 and 144 which produce the axial positioning of the rotor.

All of the loops 124 and 126 are substantially equidistant from a given point 146 on the axis of rotation $A_v$, and each of the loops is substantially perpendicular to a line such as 148 and 150 which extends from the point 146 to a center of the respective loop.

As will be seen in FIG. 18, any movement of the rotor axis $A_v$ from its normal orientation toward the tilted orientation $A_t$ will move the loops 124 and 126 from their prescribed paths. Due to the principles described in connection with FIGS. 1–10, this will cause currents to be induced in the loops which, due to the presence of the permanent magnetic fields, will exert restorative forces on the loops and rotor, tending to move the loops toward their prescribed path, and tending to move the rotor axis toward its prescribed vertical orientation $A_v$.

In the embodiment of FIGS. 18 and 19, the strengths of the fields of the magnets are adjustable. This permits adjustments in the relative strength of a pair of axially spaced magnet poles. One such pair is the north pole of a magnet 138 and the adjacent south pole of a magnet 140. These poles provide flux lines which are oppositely directed in a radial sense, as the flux lines from the north pole of magnet 138 are directed toward the rotational axis, $A_v$, and the flux lines leading to the south pole of magnet 140 are directed away from the axis $A_v$.

The field strengths of the magnets are varied by providing the permanent magnets 138, 140, 142, and 144 with supplemental electromagnet windings 145 connected to a power supply and controller unit 147 which is similar to the unit 104 described in connection with FIG. 17. The windings 145 can be energized to strengthen or weaken the field of the magnets. If the magnetic field strengths of all of the magnets 138 and 140 are varied uniformly, the stiffness of the bearing in an axial direction will be changed. Any nonuniform variation in the magnetic field strength of a pair of axially spaced poles of magnets 138 and 140 will change the location of the prescribed path of the loops 126, and it will cause the rotor to shift axially.

It will be recognized that the invention is describable in different terms. As an apparatus, an endless loop is relatively movable into and out of magnetic fields, along which the net magnetic flux is zero. The loop is laterally displaceable relative to the path of circular motion to a displaced position where the net magnetic flux passing through the inner area of the loop is not zero. This induces an electrical current in the loop when the loop is moving into the magnetic field and the direction of this electric current is such that, due to the presence of the magnetic field, lateral movement is produced between the magnet means and the loop, tending to restore the loop to the prescribed path.

As a method, the invention includes the steps of providing relative movement so a closed self-inductive loop of electrically conductive material travels along a prescribed circular path relative to and successively through the fields of a plurality of magnet means. The interior of the loop is subjected to equal magnetic flux from field(s) of each magnet means when the loop is on its prescribed path so that the net magnetic flux is zero and no electrical current is induced in the loop. Also, the interior of the loop is subjected to unequal magnetic flux from the field(s) of each magnet means when the loop deviates from its prescribed path. This induces, in the loop, an electrical current which flows in a first direction which, in the presence of the magnetic field(s) exerts a force on the loop tending to move the loop laterally toward the prescribed path.

Persons familiar with the field of the invention will recognize that its objectives may be achieved by many structures other than the preferred and disclosed embodiments. For example, the loops may have many different forms. A system may have stationary loops which react with magnets mounted on a moving object. The length of the components measured in the direction of the path P may have different proportions. It is possible to have no space along the path between adjacent magnets in situations where the magnet polarities are opposite from magnet-to-magnet. In view of these and numerous other possibilities, it is emphasized that the invention is not limited to the disclosed embodiments, but is embracing of many other structures which fall within the spirit of the following claims.

I claim:

1. A magnetic bearing system, comprising, an object which includes a plurality of closed loops of electrically conductive material with a finite inductance and a finite conductivity, magnet means including a plurality of poles formed of magnetic material, each pole having a pole surface from which a magnetic field emanates, said object and said magnet means being relatively rotatable about an axis of rotation so that said loops each travel along a closed prescribed circular path relative to and through said magnetic fields of said magnet means, said magnet means being located along said prescribed circular path and being arranged with said pole surfaces facing said prescribed circular path of the loops, said poles being positioned so that a loop moving along said prescribed path will be subjected to magnetic flux which is different at different positions of said loop along its prescribed path, said poles being positioned to (a) subject the interior of each said loop to magnetic flux to produce equal and opposed electromotive forces in said loop when said loop is on its prescribed circular path so that no substantial electrical current flows in said loop, and (b) to subject the interior of each said loop to magnetic flux to produce unequal and opposed electromotive forces in said loop when said loop deviates from its prescribed circular path so that a substantial electrical current is induced in said loop; said electrical current having a first direction which, in the presence of said magnetic fields, exerts a force on each said loop tending to move the loop toward the prescribed circular path.

2. A magnetic bearing system according to claim 1, wherein each magnet means is positioned to provide only one magnetic field in the prescribed circular path of said loop.

3. A magnetic bearing system according to claim 2, wherein said loop has two lobes which are offset in opposite directions from the prescribed path and are electrically connected together in a figure-eight relationship.

4. A magnetic bearing system according to claim 1, wherein each magnet means produces first and second said magnetic fields, said loop being positioned so as to be simultaneously exposed to said first and second magnetic fields.

5. A magnetic bearing system according to claim 4 wherein said first and second magnetic fields are at different distances from said axis of rotation.

6. A magnetic bearing system according to claim 4 wherein said first and second magnetic fields have oppositely directed lines of flux.

7. A magnetic bearing system according to claim 4, wherein said first and second magnetic fields are circumferentially spaced from each other, and said loop includes first and second lobes which are circumferentially spaced from each other at positions where said lobes pass simultaneously through their respective said magnetic fields.

8. A magnetic bearing system according to claim 4, wherein each magnet means includes a first magnet having north and south poles facing toward said path.

9. A magnetic bearing system according to claim 8 having a second magnet located on an opposite side of said path from the first magnet and also facing toward said path, said second magnet having a north pole facing the south pole of the first magnet, said second magnet having a south pole facing the north pole of the first magnet.

10. A magnetic bearing system according to claim 9, wherein said first magnet has its north and south poles located at different distances from said axis of rotation.

11. A magnetic bearing system according to claim 9, wherein said first magnet has its north and south poles located at different axial positions with respect to said axis of rotation.

12. A magnetic bearing system according to claim 4, wherein the first and second magnetic fields are in a same circumferential portion of the prescribed circular path and are positioned where laterally opposed segments of the loop are simultaneously exposed to said first and second magnetic fields.

13. A magnetic bearing system according to claim 4, wherein the first and second magnetic fields are at different locations along the circumference of the prescribed circular path so that different segments of the loop are simultaneously exposed to said first and second magnetic fields.

14. A magnetic bearing system according to claim 1 wherein the magnet means is stationary and the object is movable.

15. A magnetic bearing system according to claim 1 including secondary magnet means for creating one or more secondary magnetic fields through which said loop moves, said secondary magnet means each including a stationary electrically conductive secondary member located near said path so that magnetic fields produced by current in the loop will move relative to said secondary member to induce a current in said secondary member to create a secondary magnetic field.

16. A magnetic bearing system according to claim 15 wherein the secondary member is a stationary coil.

17. A magnetic bearing system according to claim 16 including means for terminating current flow in the stationary coil when the current in the stationary coil decreases to a predetermined magnitude.

18. A magnetic bearing system according to claim 15 wherein the secondary member is a nonmagnetic electrically conductive flux compression member in which eddy currents are induced, said flux compression member being circumferentially discontinuous in the respect that it extends along only a portion of said path of the loop.

19. A magnetic bearing system according to claim 15 including stiffness adjustment means for varying the stiffness of said bearing, said stiffness adjustment means including means for changing the flow of current in said secondary member.

20. A magnetic bearing system according to claim 19 wherein said means for changing the flow of current is a variable resistor.

21. A magnetic bearing system according to claim 1 wherein adjacent magnet means are spaced apart a distance of about 0 to 2 D where "D" is the length of a said loop measured parallel to said path.

22. A magnetic bearing system according to claim 1 wherein the dimension of said magnet means measured parallel to said path is about 0.5 D to 2 D where "D" is the length of said loop measured parallel to said path.

23. A magnetic bearing system according to claim 1 wherein L/R is approximately D/2 v, where the loop has a resistance R, a length D measured parallel to said path, a self-inductance L, and a relative velocity v.

24. A magnetic bearing system according to claim 1, having flux compression means for providing magnetic flux lines which are opposite in direction to flux lines produced by current flowing in said loop, said flux compression means being nonmagnetic electrically conductive and having a surface positioned adjacent to said loop so as to be struck by flux lines produced by current flowing in said loop.

25. A magnetic bearing system according to claim 24 wherein said flux compression means extends along said path and said surface is positioned between said loop and said magnet means.

26. A magnetic bearing system according to claim 25, wherein said surface faces said loop and is divided into spaced apart areas.

27. A magnetic bearing system according to claim 26 wherein said areas of said surface are spaced apart in a circumferential direction.

28. A magnetic bearing system according to claim 26 wherein said areas of said surface are spaced apart in a radial direction.

29. A magnetic bearing system according to claim 26 wherein said areas of said surface face in radial and axial directions.

30. A magnetic bearing system according to claim 1 wherein said loop is formed of a plurality of conductors in parallel and insulated from each other.

31. A magnetic bearing system according to claim 30 wherein at least some of said conductors are twisted together.

32. A magnetic bearing system according to claim 1 wherein said electrical current in said loop is reversible to flow in an opposite second direction which, in the presence of said magnetic field(s), tends to move the loop laterally away from the prescribed path; said electrical current flowing for a longer time in said first direction than in said second direction while said loop is in said magnetic field(s).

33. A magnetic bearing system according to claim 1 wherein said electrical current in said loop is reversible to flow in an opposite second direction which, in the presence of said magnetic field(s), tends to move the loop laterally away from the prescribed path, said loop having longitudinal components with greater lengths thereof located in the fields while current flows in said first direction than while current flows in said second direction, whereby the current in the first direction produces a greater average force on the loop than the current in the second direction.

34. A magnetic bearing system according to claim 1 wherein said loop has a leading leg and a trailing leg which are connected together to form said loop, and relative movement in said path including the following phases:
(i) a first phase which commences when the leading leg of the loop has entered said magnetic field(s) and the trailing leg of the loop has not yet entered said magnetic field(s),
(ii) a second phase which commences when at least a portion of the loop's interior is in the fields, and the exposures of leading and trailing legs of the loop to the magnet means are substantially equal at a field intensity ranging from zero to a finite value,
(iii) a third phase which commences when the leading leg has exited the field(s) and the trailing leg is in the field(s), and
(iv) a fourth phase when both the leading and trailing legs have exited the field(s);
said loop having a self inductance which causes a first self-induced current to flow in said first direction in the loop while at least a portion of the loop's interior is in the field(s) to affect the lateral position of the loop, said self inductance also causing a second self-induced current to flow in an opposite second direction in the loop after all of the loop's interior has moved beyond said field(s).

35. A magnetic bearing system according to claim 34 wherein, during the second phase, the leading and trailing legs are both in said field(s).

36. A magnetic bearing system according to claim 35 wherein, during the second phase, neither the leading nor trailing legs of the loop are in said field(s).

37. A magnetic bearing system according to claim 34 wherein each of said magnet means provides two magnetic fields with oppositely directed lines of flux, adjacent magnet means along said path being oppositely oriented so that, on each side of the prescribed path, the magnetic fields of circumferentially adjacent magnet means are oppositely directed.

38. A magnetic bearing system according to claim 1 including stiffness adjustment means for varying the stiffness of said system, said stiffness adjustment means being operable to vary uniformly the strength of the magnetic flux to which the interiors of the loops are exposed.

39. A magnetic bearing system according to claim 38 wherein said magnet means are permanent magnets, and the adjustment means includes electromagnet windings on said permanent magnets.

40. A magnetic bearing system according to claim 39 wherein the adjustment means includes means for changing the flow of current in said electromagnet windings.

41. A magnetic bearing system according to claim 1 including adjustment means for shifting the position of said object relative to said magnet means, said adjustment means being operable to vary nonuniformly the strength of the magnetic flux to which the interiors of the loops are exposed so it is not equal at all poles of said magnet means.

42. A magnetic bearing system according to claim 41 wherein the magnet means has poles which are arranged in pairs, each pair of poles being two radially spaced poles, each pair of poles providing two magnetic fields with flux lines which are oppositely directed in an axial sense, and the adjustment means varies nonuniformly the strength of said two magnetic fields to shift the prescribed path in a radial direction.

43. A magnetic bearing system according to claim 41 wherein the magnet means has poles which are arranged in pairs, each pair of poles being two axially spaced poles, each pair of poles providing two magnetic fields with flux lines which are oppositely directed in a radial sense, and the adjustment means varies nonuniformly the strength of said two magnetic fields to shift the prescribed path in an axial direction.

44. A magnetic bearing system according to claim 41 wherein said magnet means are permanent magnets, and the adjustment means includes electromagnet windings on said permanent magnets.

45. A magnetic bearing system according to claim 44 wherein the adjustment means includes means for changing the flow of current in said electromagnet windings.

46. A magnetic bearing system according to claim 1, said axis of rotation having a prescribed orientation from which it is tiltable, said magnet means and said loop being at positions where tilting of the axis or rotation moves the loops away from the prescribed path, whereby said electrical current exerts a force tending to restore the axis of rotation to its prescribed orientation.

47. A magnetic bearing system according to claim 46, wherein said object has a first loop being oriented at a first angle relative to said axis of rotation, and a second loop being oriented at a second angle relative to said axis of rotation, said second angle being different from said first angle.

48. A magnetic bearing system according to claim 47, wherein said first angle is between 45° and 90°.

49. A magnetic bearing system according to claim 47, wherein said second angle is between 0° and 45°.

50. A magnetic bearing system according to claim 46, wherein all of said loops are substantially equidistant from a given point on said axis of rotation, and each of said loops is substantially perpendicular to a respective line which is drawn from said given point to a center of said loop.

51. A magnetic bearing system according to claim 1 having an iron core located in said loop.

52. A passive magnetic bearing for automatically positioning a second member which moves relative to a first member, comprising:
   magnet means mounted on said first member for creating two magnetic fields which have oppositely directed lines of flux,
   a plurality of endless loops of electrically conductive material on said second member, said loops having a finite conductivity,
   each of said endless loops being an electrical conductor which surrounds an inner area within said loop,
   said second member being movable to move said endless loops into and out of said magnetic fields, said movement being along a prescribed path along which the net magnetic flux is substantially zero, said prescribed path being circular,
   said second member being laterally displaceable to divert said loops from said prescribed circular path to a displaced position where the net magnetic flux passing through the inner area of a said loop is not zero to induce an electrical current in said loop when said loop is moving into said magnetic fields, said electrical current having a direction which, due to the presence of said magnetic fields, produces lateral relative movement between said magnet means and said loop, tending to restore the movement to said prescribed path.

53. A method of operating a magnetic bearing system which has magnet means for producing one or more magnetic fields, and an object which includes a plurality of closed, self-inductive loops of material which has a finite electrical conductivity, said method including the following steps:
   moving said loops through said magnetic field(s) along a prescribed path which is substantially circular and is located around an axis of rotation,
   subjecting the interior of each said loop to magnetic flux from said field(s) when said loop is on its prescribed path so that the net magnetic flux is substantially zero and no electrical current is induced in said loop,
   subjecting the interior of said loops to unequal magnetic flux from said field(s) when said loops deviate from their prescribed paths to induce, in said loops, an electrical current in a first direction which, in the presence of said magnetic field(s), exerts a force on said loops tending to move the loops laterally toward the prescribed path.

54. A method according to claim 53 wherein said magnet means produces two magnetic fields which are at different distances from the axis of rotation.

55. A method according to claim 53 wherein said magnet means produces two magnetic fields which are at different axial positions in relation to said axis of rotation.

56. A magnetic bearing system according to claim 53 wherein said magnet means produces two magnetic fields which have oppositely directed lines of flux.

57. A method according to claim 53 wherein said loop has a leading leg, a trailing leg, and means connecting the leading and trailing legs to form said loop, said relative movement including the following phases:
   a first phase which commences when the leading leg of the loop has entered said magnetic field(s) and the trailing leg of the loop has not yet entered said magnetic field(s),
   a second phase which commences when at least a portion of the loop's interior is in the field(s), and the exposures of leading and trailing legs of the loop to the magnet means are substantially equal at a field intensity ranging from zero to a finite value,
   a third phase which commences when the leading leg has exited the field(s) and the trailing leg is in the fields, and
   a fourth phase when both the leading and trailing legs have exited the field(s);
causing a first self-induced current to flow in said first direction in the loop while at least a portion of the loop's interior is in the field(s) to affect the lateral position of the loop, and
causing a second self-induced current to flow in an opposite second direction in the loop after all of the loop's interior has moved beyond said field(s).

58. A method according to claim 53 further including the step of providing magnetic flux lines which are opposite in direction to flux lines produced by current flowing in said loop, said opposite magnetic flux lines being provided by positioning an electrically conductive member having a surface positioned adjacent to said loop where it is struck by flux lines produced by current flowing in said loop.

59. A method according to claim 58 wherein said surface is divided into spaced apart areas which are located on opposite sides of said magnet means.

60. A magnetic bearing system, comprising,
   an object which includes a plurality of closed loops of electrically conductive material with a finite inductance,
   a plurality of stationary magnet means which each produce first and second magnetic fields,
   said object being rotatable about an axis of rotation so that said loops travel along a prescribed circular path relative to and through said magnetic fields of each magnet means, said magnet means being located along said prescribed circular path, each magnet means including a magnet having north and south poles positioned in a same circumferential position of the prescribed circular path, said poles facing said path at positions where laterally opposed segments of the loop are simultaneously exposed respectively to said first and second magnetic fields, adjacent said magnets being spaced apart a distance of 0 to 2 D and each having a dimension of 0.5 D to 2 D measured parallel to said path where "D" is the length of a said loop measured parallel to said path, a plurality of said magnets having their north and south poles located at different distances from the axis of rotation, a plurality of said magnets having their north and south poles located at different axial positions with respect to said axis of rotation, said magnetic fields of each magnet means being positioned to (a) subject the interior of said loop to magnetic flux to produce equal and opposed electromotive forces in said loop when said loop is on its prescribed circular path so that no electrical current flows in said loop, and (b) to subject the interior of said loop to magnetic flux to produce unequal and opposed electromotive forces in said loop when said loop deviates from its prescribed circular path so that an electrical current is induced in said loop; said electrical current having a first direction which, in the presence of said magnetic fields, exerts a force on said loop tending to move the loop toward the prescribed circular path, L/R being approximately D/2 v, where the loop has a resistance R, a length D measured parallel to said path, a self-inductance L, and a relative velocity v; and, flux compression means for providing magnetic flux lines which are opposite in direction to flux lines produced by current flowing in said loop, said flux compression means being nonmagnetic and electrically conductive and having a surface positioned adjacent to said loop so as to be struck by flux lines produced by current flowing in said loop.

61. A magnetic bearing system, comprising, an object which includes a plurality of closed loops of electrically conductive material with a finite inductance, each loop having two lobes which are spaced apart circumferentially, a plurality of circumferentially arranged stationary magnet means which each produce a magnetic field, said object being rotatable about an axis of rotation so that said lobes travel along a prescribed circular path relative to and through said magnetic fields of said magnet means, said magnet means being located along said prescribed circular path, said magnet means having pole facing said path at positions where two lobes of a loop are simultaneously exposed respectively to two circumferentially spaced magnetic fields, adjacent said magnets being spaced apart a distance of 0 to 2 D and each having a dimension of 0.5 D to 2 D measured parallel to said path where "D" is the length of a said loop measured parallel to said path, said magnetic fields being positioned to (a) subject the interior of said loop to magnetic flux to produce equal and opposed electromotive forces in said loop when said loop is on its prescribed circular path so that no electrical current flows in said loop, and (b) to subject the interior of said loop to magnetic flux to produce unequal and opposed electromotive forces in said loop when said loop deviates from its prescribed circular path so that an electrical current is induced in said loop; said electrical current having a first direction which, in the presence of said magnetic fields, exerts a force on said loop tending to move the loop toward the prescribed circular path, L/R being approximately D/2 v, where the loop has a resistance R, a length D measured parallel to said path, a self-inductance L, and a relative velocity v; and, flux compression means for providing magnetic flux lines which are opposite in direction to flux lines produced by current flowing in said loop, said flux compression means being nonmagnetic and electrically conductive and having a surface positioned adjacent to said loop so as to be struck by flux lines produced by current flowing in said loop.

62. A magnetic bearing system, comprising, an object which includes a plurality of closed loops of electrically conductive material with a finite inductance and a finite conductivity, magnet means including a plurality of poles formed of magnetic material, each pole having a pole surface from which a magnetic field emanates, said object and said magnet means being relatively rotatable about an axis of rotation so that said loops each travel along a closed prescribed circular path relative to and through said magnetic fields of said magnet means, said magnet means being located along said prescribed circular path and being arranged with said pole surfaces facing said prescribed circular path of the loops, said poles being positioned so that a loop moving along said prescribed path will be subjected to magnetic flux which is different at different positions of said loop along its prescribed path, said poles being positioned to (a) subject the interior of each said loop to magnetic flux to produce equal and opposed electromotive forces in said loop when said loop is on its prescribed circular path so that no substantial electrical current flows in said loop, and (b) to subject the interior of each said loop to magnetic flux to produce unequal and opposed electromotive forces in said loop when said loop deviates from its prescribed circular path so that a substantial electrical current is induced in said loop; said electrical current having a first direction which, in the presence of said magnetic fields, exerts a force on each said loop tending to move the loop toward the prescribed circular path, and adjustment means for varying the strength of the magnetic flux to which the loops are exposed.

63. A magnetic bearing system according to claim 62 in which the adjustment means includes supplemental magnet means for providing magnetic flux to which the loops are exposed.

64. A magnetic bearing system according to claim 62 in which the supplemental magnet means is a set of circumferentially disposed electromagnets.

65. A magnetic bearing system according to claim 62 in which the electromagnets have axially-facing poles.

66. A magnetic bearing system according to claim 62 in which the adjustment means varies nonuniformly the strength of the flux to which the loops are exposed to shift the position of the prescribed path.

67. A magnetic bearing system according to claim 62 in which the adjustment means varies uniformly the strength of the flux to which the loops are exposed to vary the stiffness of the bearing system.

* * * * *